(12) United States Patent
Gondek et al.

(10) Patent No.: US 11,288,558 B2
(45) Date of Patent: Mar. 29, 2022

(54) DITHERING BASED COLOR CONVERSION

(71) Applicant: Hewlett-Packard Development Company, L.P., Spring, TX (US)

(72) Inventors: Jay S. Gondek, Vancouver, WA (US); Jason M. Quintana, Vancouver, WA (US); Weiyun Sun, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/059,285

(22) PCT Filed: Oct. 31, 2018

(86) PCT No.: PCT/US2018/058521
§ 371 (c)(1),
(2) Date: Nov. 27, 2020

(87) PCT Pub. No.: WO2020/091768
PCT Pub. Date: May 7, 2020

(65) Prior Publication Data
US 2021/0279536 A1    Sep. 9, 2021

(51) Int. Cl.
*G06K 15/02* (2006.01)
*B41J 2/21* (2006.01)

(52) U.S. Cl.
CPC ..... *G06K 15/1878* (2013.01); *G06K 15/1881* (2013.01); *B41J 2/21* (2013.01)

(58) Field of Classification Search
CPC .... G06K 15/1878; G06K 15/1881; B41J 2/21
See application file for complete search history.

(56) References Cited

U.S. PATENT DOCUMENTS

| | | | |
|---|---|---|---|
| 9,108,428 B2 | 8/2015 | Shimada | |
| 9,832,350 B2 | 11/2017 | Kakutani | |
| 2007/0121137 A1 | 5/2007 | Kakutani | |
| 2017/0075247 A1 | 3/2017 | Jinno | |
| 2018/0013928 A1 | 1/2018 | Shaw | |
| 2018/0013929 A1 | 1/2018 | Tang | |
| 2018/0063381 A1* | 3/2018 | Takesue | G01J 3/524 |
| 2018/0096234 A1* | 4/2018 | Yamada | H04N 1/4092 |
| 2018/0103178 A1 | 4/2018 | Tamura | |

FOREIGN PATENT DOCUMENTS

| | | | |
|---|---|---|---|
| JP | 2000092323 A | 3/2000 | |
| WO | WO-2017221568 A1 | 12/2017 | |
| WO | WO-2018147861 A1 | 8/2018 | |

\* cited by examiner

*Primary Examiner* — Quang N Vo
(74) *Attorney, Agent, or Firm* — HP Inc. Patent Department

(57) ABSTRACT

In some examples, dithering based color conversion may include ascertaining an input color value. Based on conversion of the input color value to an output color space representation, a set of nodes that are to be analyzed to control operation of a printer may be determined. Based on a position of the input color value from each node of the set of nodes, a corresponding probability associated with each node of the set of nodes may be determined. Further, the operation of the printer may be controlled based on the determined probability associated with each node of the set of nodes.

15 Claims, 4 Drawing Sheets

300

┌─────────────────────────────────────────┐
│     ASCERTAIN AN INPUT COLOR VALUE      │
│                  302                    │
└─────────────────────────────────────────┘
                    ▼
┌─────────────────────────────────────────┐
│ CONVERT THE INPUT COLOR VALUE TO AN OUTPUT COLOR SPACE │
│ REPRESENTATION BASED ON ANALYSIS OF A MULTI-DIMENSIONAL │
│              LOOKUP TABLE               │
│                  304                    │
└─────────────────────────────────────────┘
                    ▼
┌─────────────────────────────────────────┐
│ DETERMINE, BASED ON THE CONVERTING OF THE INPUT COLOR │
│ VALUE TO THE OUTPUT COLOR SPACE REPRESENTATION, A SET OF │
│ NODES FROM THE MULT-IDIMENSIONAL LOOKUP TABLE THAT ARE TO │
│   BE ANALYZED TO CONTROL OPERATION OF A PRINTHEAD   │
│                  306                    │
└─────────────────────────────────────────┘
                    ▼
┌─────────────────────────────────────────┐
│ DETERMINE, BASED ON A POSITION OF THE INPUT COLOR VALUE │
│  FROM EACH NODE OF THE SET OF NODES, A CORRESPONDING  │
│ PROBABILITY ASSOCIATED WITH EACH NODE OF THE SET OF NODES │
│                  308                    │
└─────────────────────────────────────────┘
                    ▼
┌─────────────────────────────────────────┐
│ CONTROL, BASED ON THE DETERMINED PROBABILITY ASSOCIATED │
│ WITH EACH NODE OF THE SET OF NODES, THE OPERATION OF THE │
│                PRINTHEAD                │
│                  310                    │
└─────────────────────────────────────────┘

*FIG. 3*

DITHERING BASED COLOR CONVERSION

BACKGROUND

A variety of techniques may be used for printing on media. One such technique includes the use of thermal printheads. Thermal printheads may utilize a set of resistor elements that are heated to apply heat directly to the media, or to a thermal transfer ribbon. The applied heat may produce a specified print pattern on the media. The specified print pattern may include, for example, text, images, and other such patterns.

BRIEF DESCRIPTION OF DRAWINGS

Features of the present disclosure are illustrated by way of example and not limited in the following figure(s), in which like numerals indicate like elements, in which:

FIG. 3 illustrates an example flowchart of a method for performing dithering based color conversion.

DETAILED DESCRIPTION

Figure 1:
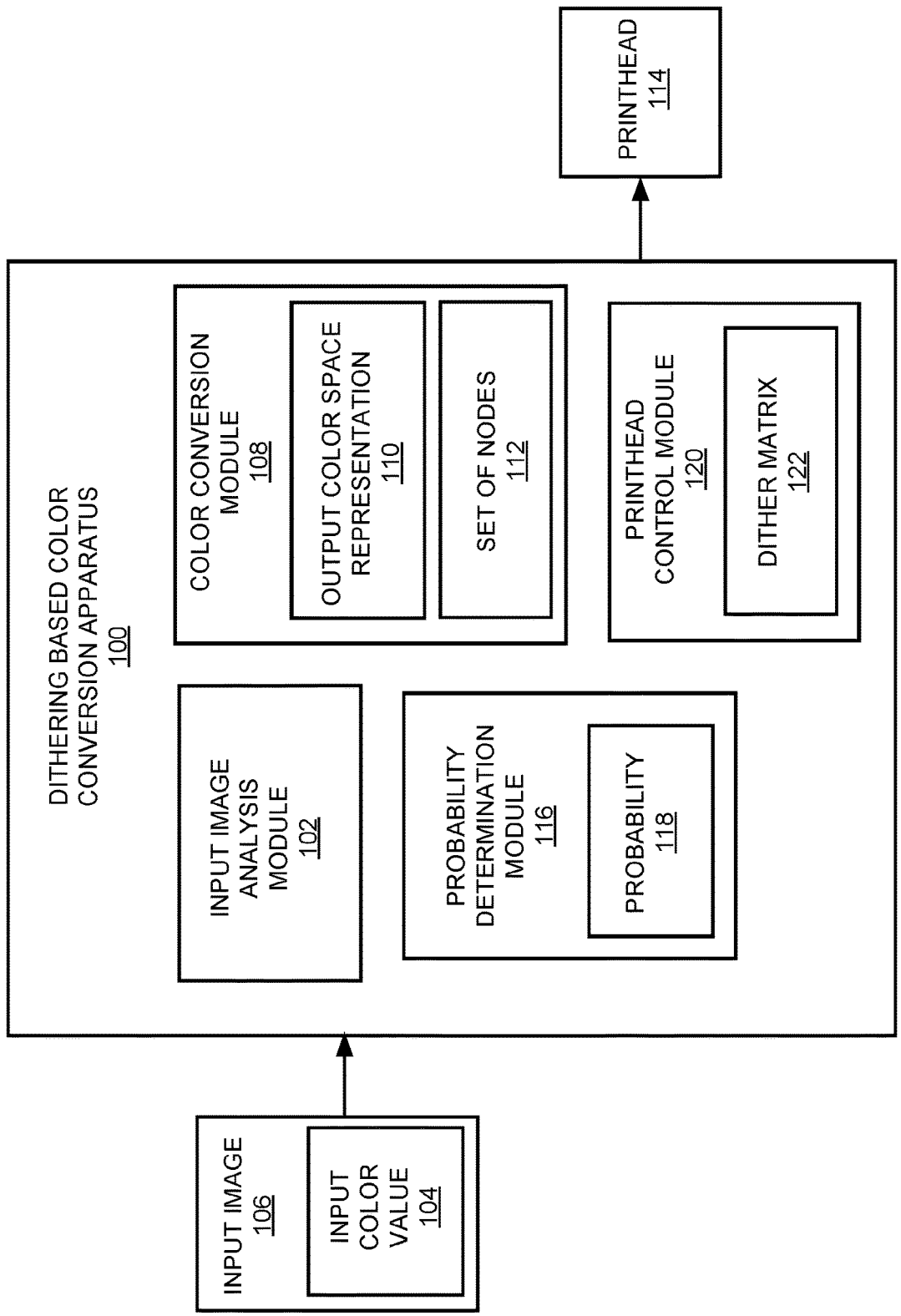
FIG. 1 illustrates an example layout of a dithering based color conversion apparatus.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Apparatuses for dithering based color conversion, methods for dithering based color conversion, and non-transitory computer readable media having stored thereon machine readable instructions to provide dithering based color conversion are disclosed herein. The apparatuses, methods, and non-transitory computer readable media disclosed herein provide for implementation of halftone dithering to perform a desired combination of multi-dimensional look-up-table (LUT) output nodes that may not otherwise be linearly combinable when converting an input color value to an output color space representation.

With respect to the apparatuses, methods, and non-transitory computer readable media disclosed herein, color conversions for printers and other imaging devices may be expressed as a three-dimensional (3D) LUT. The 3D LUT may be indexed, for example, with red (R), green (G), and blue (B) axes that may represent the RGB signals of a standard RGB image representation space such as sRGB. The LUT may also be indexed, for example, by cyan (C), magenta (M), yellow (Y), and black (B) (e.g., a 4D LUT), Commission Internationale de l'Eclairage (CIE) L*a*b*, and other such techniques. The output nodes of the 3D LUT may represent device dependent values for an output device. For example, an sRGB indexed 3D LUT may include printer CMYK amounts that, when printed, produce a reasonable visual color match to an input color.

For an example of a 3D LUT, a 3D LUT used for color conversion may represent a uniform sub-sampling of the input space, and may include, for example 17 or 33 output nodes along each axis, for a total of 17-cubed or 33-cubed total output nodes for the entire 3D LUT. The 3D LUT may be interpolated to produce output values when an input does not correspond to one of the nodes in the 3D LUT. For example, several nodes of the 3D LUT may be mathematically interpolated to produce output CMYK values. In this regard, interpolation techniques such as tri-linear, tetrahedral, or other such techniques may be implemented. Tri-linear interpolation may be performed by determining a weighted average of eight surrounding 3D LUT values for an 8-node "cube" within the 3D LUT. Tetrahedral interpolation may utilize four weighted nodes for each interpolated point.

A dither matrix may represent a two-dimensional (2D) array of uniformly distributed values. The dither matrix may be indexed by a pixel position on an image. With respect to halftoning, given a fill density, the probability of a dot firing may be equal to the fill density. For example, in order to halftone a 10% fill, where a dither matrix is indexed by an addressable pixel position on the image, 10% of the dither matrix elements may include threshold values that indicate a dot should be fired (e.g., a threshold of <=10). The remaining 90% of the threshold values may be greater than 10%, which results in a 10% chance of a dot firing, and a 90% chance of not firing a dot.

A 3D LUT may provide for the expression of color conversion based on interpolation of output node values. For example, output contone CMYK amounts may be interpolated, where the contone output values may represent increasing amounts of printer inks as the output values may vary from zero to their maximum values.

In some cases, such as thermal printing with multi-layer thermal photo paper, a color conversion may be expressed as a discrete 3D LUT color table. In this regard, it is technically challenging to mathematically interpolate the values stored in the 3D LUT table. For example, the values in the 3D LUT may include a discrete pulse pattern that is intended to be transmitted to a thermal printhead to control printhead temperature. For an input RGB value, with respect to the surrounding nodes that are to be interpolated (e.g., with respect to Tri-linear, Tetrahedral, or other such interpolation techniques) it is technically challenging to mathematically combine such nodes as each node may contain a unique pulse pattern.

In order to address the aforementioned technical challenges, the apparatuses, methods, and non-transitory computer readable media disclosed herein provide for implementation of halftone dithering to accomplish the desired linear combination of 3D LUT output nodes that may not otherwise be linearly combinable.

With respect to interpolation techniques such as tri-linear interpolation, tetrahedral interpolation, etc., the position of a desired input/output combination, after computation, may be expressed as a set of weights associated with surrounding available nodes in the 3D LUT. For example, with tetrahedral interpolation, a four-node tetrahedron may be identified, and weights for those four nodes may be determined based on the position of the input point (e.g., input color value) within that tetrahedron. These weights may be multiplied by the surrounding node points to determine a linear combination of output node values to produce an intermediate value.

For the apparatuses, methods, and non-transitory computer readable media disclosed herein, the weights for the nodes (e.g., with respect to Tri-linear, Tetrahedral, or other such interpolation techniques) may be interpreted as probabilities. For example, during the tetrahedral interpolation process, given the four surrounding nodes n1, n2, n3, and n4 of the containing tetrahedron, the interpolation may determine that the input value is represented as 50% of n1, 10% of n2, 30% of n3 and 10% of n4. In this regard, instead of using the weight values for multiplication and summation to produce a resulting value, for the apparatuses, methods, and non-transitory computer readable media disclosed herein, the weights may be interpreted as probabilities. For the example of the input value represented as 50% of n1, 10% of n2, 30% of n3 and 10% of n4, the weights being interpreted as probabilities may be interpreted as a 50% probability that n1 is printed, a 10% probability that n2 is printed, etc. Over a large area, if these probabilities are achieved, the average resulting printed area may include the correct mixture of those nodes to represent a desired intermediate color.

Thus, for the apparatuses, methods, and non-transitory computer readable media disclosed herein, the probabilities associated with discrete node values may be achieved in print with the use of the halftone dither matrix. The dither matrix may include a uniform distribution of values, and these values may be arranged spatially to produce a well dispersed distribution of printer dots.

In examples described herein, module(s), as described herein, may be any combination of hardware and programming to implement the functionalities of the respective module(s). In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates an example layout of a dithering based color conversion apparatus (hereinafter also referred to as "apparatus 100").

Referring to FIG. 1, the apparatus 100 may include an input image analysis module 102 to ascertain an input color value 104 from an input image 106. In this regard, the input image 106 may need to be converted to a color format specific to an output device.

A color conversion module 108 may determine, based on conversion of the input color value 104 to an output color space representation 110, a set of nodes 112 that are to be analyzed to control operation of a printhead 114. For example, the set of nodes 112 may include nodes of a look-up-table that is used to convert the input color value 104 to the output color space representation 110. Further, the set of nodes 112 of the look-up-table may be identified based on a type of interpolation technique (e.g., Tri-linear, Tetrahedral, or other such interpolation techniques) that is used.

According to examples disclosed herein, the color conversion module 108 may determine, based on conversion of the input color value 104 to the output color space representation 110, the set of nodes 112 that are to be analyzed to control operation of the printhead 114 by analyzing a three-dimensional (3D) lookup table indexed with red (R), green (G), and blue (B) axes. Further, the color conversion module 108 may determine, based on the analyzing of the three-dimensional lookup table to convert the input color value 104 to the output color space representation 110, the set of nodes 112 that are to be analyzed to control operation of the printhead 114.

According to examples disclosed herein, the color conversion module 108 may determine, based on conversion of the input color value 104 to the output color space representation 110, the set of nodes 112 that are to be analyzed to control operation of the printhead 114 by analyzing a four-dimensional (4D) lookup table indexed with cyan (C), magenta (M), yellow (Y), and black (B) axes. The color conversion module 108 may determine, based on the analyzing of the four-dimensional lookup table to convert the input color value 104 to the output color space representation 110, the set of nodes 112 that are to be analyzed to control operation of the printhead 114.

According to examples disclosed herein, the color conversion module 108 may determine, based on conversion of the input color value 104 to the output color space representation 110, the set of nodes 112 that are to be analyzed to control operation of the printhead 114 by determining, based on conversion of the input color value 104 to the output color space representation 110, the set of nodes of a four-node tetrahedron, an eight-node cube, or another such structure.

A probability determination module 116 may determine, based on a position of the input color value 104 from each node of the set of nodes 112, a corresponding probability 118 associated with each node of the set of nodes 112. In this regard, as disclosed herein, the weights for the nodes (e.g., with respect to Tri-linear, Tetrahedral, or other such interpolation techniques) may be interpreted as probabilities. For example, as disclosed herein, during the tetrahedral interpolation process, given the four surrounding nodes n1, n2, n3, and n4 of the containing tetrahedron, the interpolation may determine that the input value is represented as 50% of n1, 10% of n2, 30% of n3 and 10% of n4. In this regard, instead of using the weight values for multiplication and summation to produce a resulting value, the weights may instead be interpreted as probabilities. For the example of the input value represented as 50% of n1, 10% of n2, 30% of n3 and 10% of n4, the weights being interpreted as probabilities may be interpreted as a 50% probability that n1 is printed, a 10% probability that n2 is printed, etc.

A printhead control module 120 may control, based on the determined probability 118 associated with each node of the set of nodes 112, the operation of the printhead 114. In this regard, the printhead control module 120 may generate a signal to print contents of an appropriate node (e.g., n1, n2, n3, or n4 as disclosed herein).

According to examples disclosed herein, the printhead control module 120 may control, based on the determined probability 118 associated with each node of the set of nodes 112, the operation of the printhead 114 by dividing, based on the determined probability associated with each node of the set of nodes 112, a threshold range of a dither matrix 122 into probability ranges for printing contents of nodes of a lookup table (e.g., a 3D LUT, a 4D LUT, etc., as disclosed herein). The printhead control module 120 may determine a pixel position corresponding to the input color value 104. The printhead control module 120 may determine, based on analysis of the set of nodes 112, a node of the set of nodes 112 that corresponds to the determined pixel position and a divided threshold range of the dither matrix 122. Further, the printhead control module 120 may control, based on an output pulse pattern associated with the determined node (e.g., n1, n2, n3, or n4), the operation of the printhead 114.

Examples of operation of the apparatus 100 are disclosed herein with further reference to FIG. 1.

According to examples disclosed herein, for the apparatus 100, during a tetrahedral interpolation process, given the four surrounding nodes n1, n2, n3, and n4 of the containing tetrahedron, an interpolation may determine that the input value is represented as 50% of n1, 10% of n2, 30% of n3 and 10% of n4. These weights may be determined by interpolation. For example, for regular grids, the interpolation technique that is utilized may be more complex compared to distance weighted, or may at least include different properties. Interpolation techniques may enforce the points that are used to determine computed weights. For example, in tetrahedral interpolation, if an input point is on the edge of a tetrahedron, the weights may be determined from the two points on that edge. If the input point is on the face of a tetrahedron, weights may be determined from the three points on the face. In print, this may provide the needed control for the gray neutral axis, and other transitions such as linear ramps from white to color, or color to black. The weights being interpreted as probabilities may be interpreted as a 50% probability that n1 is printed, a 10% probability that n2 is printed, etc. Thus, for the aforementioned example of a 10% dot fill, 10% of the dither matrix may include values that indicate a dot should fire, 90% of the dither matrix may include values that indicate a dot should not fire, and the threshold values may be well dispersed spatially and indexed by position on an image.

The threshold range of the dither matrix may be divided into probability ranges for printing of the contents, for example, of 3D LUT nodes. The threshold values contained in a dither matrix may range from 0 to 255. An even distribution of those values ranging from 0 to 255 may be spread across the 2D halftone matrix. Generally those values may be repeated because a 2D halftone matrix may be much larger than 256 entries in size. With respect to N1 being 50%, a range of 0 to 127 of the matrix threshold range may be assigned to N1, because 50% of the threshold range may need to be chosen to represent the probability that N1 is chosen. With respect to N2 being 10%, a range of 128-153 may be assigned to N2, which may be 10% of the threshold range, representing the 10% probability that N2 will be chosen. With respect to N3 being 30%, N3 may be assigned a range of 154-231, and N4 may be assigned a range of 232 to 255 (approximately). On an image, at a particular X, Y pixel position, the RGB contents of that pixel may determine the weights as probabilities. The X and Y location of the pixel may be used to index into the dither matrix, and the matrix may contain a threshold value. The threshold value, which may range from 0 to 255, may be compared to the ranges that are assigned to N1, N2, N3, and N4. Depending on where the threshold lands, the results may be used to determine the signal that is printed. In general, the probabilities may be ordered from largest to smallest before assigning the threshold ranges. For example 50% may be assigned 0-127, then the next largest, where 30% is assigned 128-203, then 10% may be assigned 204-229, and the next 10% may be assigned 230-255. The dither matrix may include a halftone dither matrix. During printing, the contents of the nodes may be printed at a probability that matches the interpolation weights. Thus, instead of printing an interpolated value, the node corners may be printed at a spatially distributed probability so that the average value over a reasonably large set of pixels may produce node densities that match what an interpolator would have determined for one single printed pixel.

A range of the halftone dither matrix may be divided into regions associated with surround nodes, with the size of each divided region being proportional to the probability (or weight) determined for the nodes. The value in the matrix that is indexed by image position may be compared to the divided range. In this regard, the position on an image may include an X, Y index that gives a pixel location. If a matrix is 128×128, the matrix may be indexed by the image position by taking the image X, Y position modulo 128 to index the matrix. Thus, the matrix may be tiled over an image so that it repeats. Matrices may be designed so that when they are tiled on an image, the resulting patterns are continuous over the tiled region. Further, the contents of a node may be printed based on where the threshold lands in this range.

For example, for the aforementioned example of 50% dot fill for n1, 10% dot fill for n2, 30% dot fill for n3 and 10% dot fill for n4, if matrix values threshold range includes 1 to 100, values 1-50 may be associated with n1 (e.g., 50% probability), values 51-60 may be associated with n2 (e.g., 10% probability), values 61-90 may be associated with n3, (e.g., 30% probability), and values 91-100 may be associated with n4 (e.g., the remaining 10% probability). The dither matrix may be indexed by the image position. For example, if the aforementioned dither matrix at that position contained 37, the contents of n1 may be printed because 37 is inside the range of 1-50. Similarly, if the dither matrix threshold instead contained 77, the contents of n3 may be printed because 77 is inside the range of 61-90, and if the dither matrix threshold contained 95, the contents of n4 may be printed because 95 is inside the range of 91-100. With respect to the aforementioned value of 37, the 37 may represent an example threshold from the dither mask. A dither mask may be predetermined using a technique such as Void and Cluster, or other such techniques utilized for halftoning.

After using the dither matrix or another method for selecting the node to use for a pixel, the value may be passed to another halftone technique. For example, when a printer in question prints continuous tone, in this case, the selected node may be able to be printed directly with no further modification. However, if a printer in question cannot print continuous tone, then the selected node may need further halftoning. If the printer is an inkjet, the node may indicate to use X % of cyan and Y % of magenta. However, if the printer prints 0% or 100% of each, another halftoning technique may be applied on the node contents.

Figure 2:
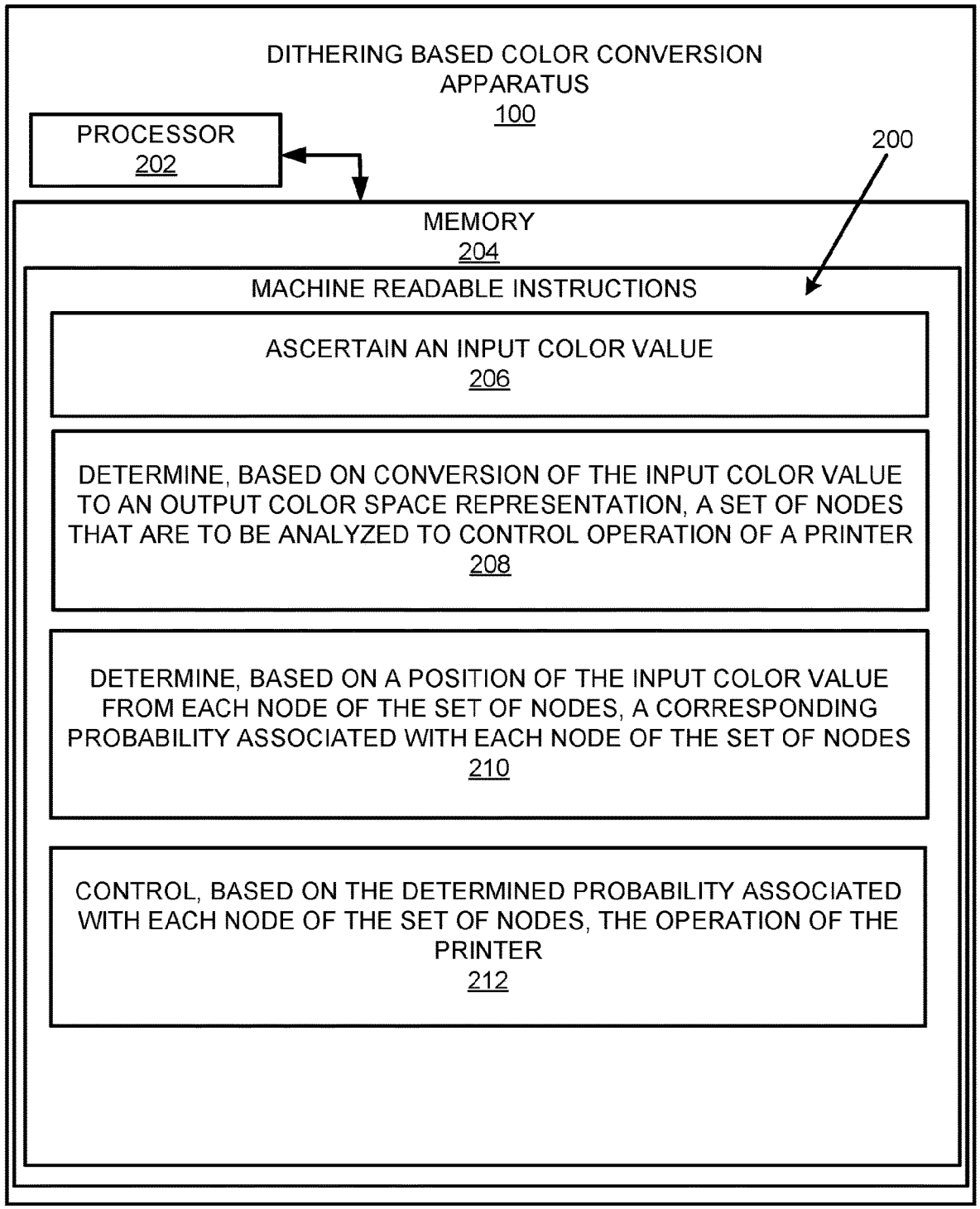
FIG. 2 illustrates an example block diagram for performing dithering based color conversion.
Figure 4:
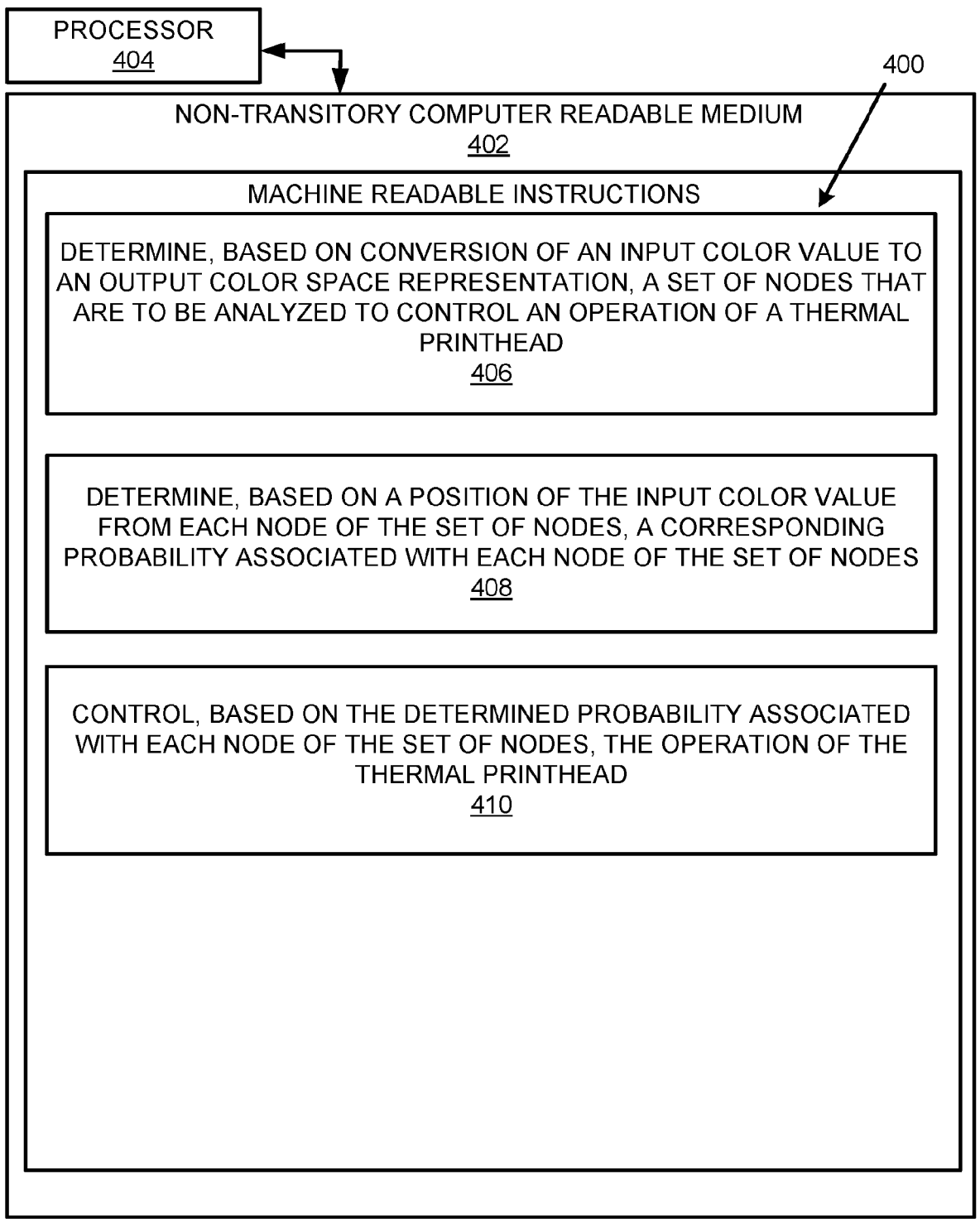
FIG. 4 illustrates a further example block diagram for performing dithering based color conversion.

FIGS. 2-4 respectively illustrate an example block diagram 200, an example flowchart of a method 300, and a further example block diagram 400 for dithering based color conversion. The block diagram 200, the method 300, and the block diagram 400 may be implemented on the apparatus 100 described above with reference to FIG. 1 by way of example and not limitation. The block diagram 200, the method 300, and the block diagram 400 may be practiced in other apparatus. In addition to showing the block diagram 200, FIG. 2 shows hardware of the apparatus 100 that may execute the instructions of the block diagram 200. The hardware may include a processor 202, and a memory 204 (i.e., a non-transitory computer readable medium) storing machine readable instructions that when executed by the processor 202 cause the processor to perform the instructions of the block diagram 200. The memory 204 may represent a non-transitory computer readable medium. FIG.

3 may represent a method for performing dithering based color conversion. FIG. 4 may represent a non-transitory computer readable medium 402 having stored thereon machine readable instructions to perform dithering based color conversion. The machine readable instructions, when executed, cause a processor 404 to perform the instructions of the block diagram 400 also shown in FIG. 4.

The processor 202 of FIG. 2 and/or the processor 404 of FIG. 4 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 402 of FIG. 4), such as hardware storage devices (e.g., RAM (random access memory), ROM (read only memory), EPROM (erasable, programmable ROM), EEPROM (electrically erasable, programmable ROM), hard drives, and flash memory). The memory 204 may include a RAM, where the machine readable instructions and data for a processor may reside during runtime.

Referring to FIGS. 1-2, and particularly to the block diagram 200 shown in FIG. 2, the memory 204 may include instructions 206 to ascertain an input color value 104.

The processor 202 may fetch, decode, and execute the instructions 208 to determine, based on conversion of the input color value 104 to an output color space representation 110, a set of nodes 112 that are to be analyzed to control operation of a printer (e.g., including the printhead 114).

The processor 202 may fetch, decode, and execute the instructions 210 to determine, based on a position of the input color value 104 from each node of the set of nodes 112, a corresponding probability 118 associated with each node of the set of nodes 112.

The processor 202 may fetch, decode, and execute the instructions 212 to control, based on the determined probability 118 associated with each node of the set of nodes 112, the operation of the printer.

Referring to FIGS. 1 and 3, and particularly FIG. 3, for the method 300, at block 302, the method may include ascertaining an input color value 104.

At block 304, the method may include converting the input color value 104 to an output color space representation 110 based on analysis of a multi-dimensional lookup table (e.g., a 3D LUT, a 4D LUT, etc.).

At block 306, the method may include determining, based on the converting of the input color value 104 to the output color space representation 110, a set of nodes 112 from the multi-dimensional lookup table that are to be analyzed to control operation of a printhead 114.

At block 308, the method may include determining, based on a position of the input color value 104 from each node of the set of nodes 112, a corresponding probability associated with each node of the set of nodes 112.

At block 310, the method may include controlling, based on the determined probability associated with each node of the set of nodes 112, the operation of the printhead 114.

Referring to FIGS. 1 and 4, and particularly FIG. 4, for the block diagram 400, the non-transitory computer readable medium 402 may include instructions 406 to determine, based on conversion of an input color value 104 to an output color space representation 110, a set of nodes 112 that are to be analyzed to control an operation of a thermal printhead 114.

The processor 404 may fetch, decode, and execute the instructions 408 to determine, based on a position of the input color value 104 from each node of the set of nodes 112, a corresponding probability associated with each node of the set of nodes 112.

The processor 404 may fetch, decode, and execute the instructions 410 to control, based on the determined probability associated with each node of the set of nodes 112, the operation of the thermal printhead 114.

What has been described and illustrated herein is an example along with some of its variations. The terms, descriptions and figures used herein are set forth by way of illustration and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium storing machine readable instructions that when executed by the processor cause the processor to:
      ascertain an input color value;
      determine, based on conversion of the input color value to an output color space representation, a set of nodes that are to be analyzed to control operation of a printer;
      determine, based on a position of the input color value from each node of the set of nodes, a corresponding probability associated with each node of the set of nodes; and
      control, based on the determined probability associated with each node of the set of nodes, the operation of the printer.

2. The apparatus according to claim 1, wherein the instructions to determine, based on conversion of the input color value to the output color space representation, the set of nodes that are to be analyzed to control operation of the printer, are further to cause the processor to:
   analyze a three-dimensional lookup table indexed with red (R), green (G), and blue (B) axes; and
   determine, based on analysis of the three-dimensional lookup table to convert the input color value to the output color space representation, the set of nodes that are to be analyzed to control operation of the printer.

3. The apparatus according to claim 1, wherein the instructions to determine, based on conversion of the input color value to the output color space representation, the set of nodes that are to be analyzed to control operation of the printer, are further to cause the processor to:
   analyze a multi-dimensional lookup table indexed with a number of color values and temperature; and
   determine, based on analysis of the multi-dimensional lookup table to convert the input color value to the output color space representation, the set of nodes that are to be analyzed to control operation of the printer.

4. The apparatus according to claim 1, wherein the instructions to determine, based on conversion of the input color value to the output color space representation, the set of nodes that are to be analyzed to control operation of the printer, are further to cause the processor to:
   determine, based on conversion of the input color value to the output color space representation, the set of nodes of a four-node tetrahedron.

5. The apparatus according to claim 1, wherein the instructions to determine, based on conversion of the input color value to the output color space representation, the set of nodes that are to be analyzed to control operation of the printer, are further to cause the processor to:
determine, based on conversion of the input color value to the output color space representation, the set of nodes of an eight-node cube.

6. The apparatus according to claim 1, wherein the instructions to control, based on the determined probability associated with each node of the set of nodes, the operation of the printer, are further to cause the processor to:
control, based on the determined probability associated with each node of the set of nodes, the operation of the printer that includes a thermal printhead.

7. The apparatus according to claim 1, wherein the instructions to control, based on the determined probability associated with each node of the set of nodes, the operation of the printer, are further to cause the processor to:
divide, based on the determined probability associated with each node of the set of nodes, a threshold range of a dither matrix into probability ranges for printing contents of nodes of a lookup table;
determine a pixel position corresponding to the input color value;
determine, based on analysis of the set of nodes, a node of the set of nodes that corresponds to the determined pixel position and a divided threshold range of the dither matrix; and
control, based on an output pulse pattern associated with the determined node, the operation of the printer.

8. A computer implemented method comprising:
ascertaining an input color value;
converting the input color value to an output color space representation based on analysis of a multi-dimensional lookup table;
determining, based on the converting of the input color value to the output color space representation, a set of nodes from the multi-dimensional lookup table that are to be analyzed to control operation of a printhead;
determining, based on a position of the input color value from each node of the set of nodes, a corresponding probability associated with each node of the set of nodes; and
controlling, based on the determined probability associated with each node of the set of nodes, the operation of the printhead.

9. The computer implemented method according to claim 8, wherein determining, based on the converting of the input color value to the output color space representation, the set of nodes from the multi-dimensional lookup table that are to be analyzed to control operation of the printhead, further comprises:
analyzing the multi-dimensional lookup table that includes a three-dimensional lookup table indexed with red (R), green (G), and blue (B) axes; and
determining, based on the analyzing of the three-dimensional lookup table to convert the input color value to the output color space representation, the set of nodes from the three-dimensional lookup table that are to be analyzed to control operation of the printhead.

10. The computer implemented method according to claim 8, wherein determining, based on the converting of the input color value to the output color space representation, the set of nodes from the multi-dimensional lookup table that are to be analyzed to control operation of the printhead, further comprises:
analyzing the multi-dimensional lookup table that includes a four-dimensional lookup table indexed with cyan (C), magenta (M), yellow (Y), and black (B) axes; and
determining, based on the analyzing of the four-dimensional lookup table to convert the input color value to the output color space representation, the set of nodes from the four-dimensional lookup table that are to be analyzed to control operation of the printhead.

11. The computer implemented method according to claim 8, wherein determining, based on the converting of the input color value to the output color space representation, the set of nodes of the multi-dimensional lookup table that are to be analyzed to control operation of the printhead, further comprises:
determining, based on the converting of the input color value to the output color space representation, the set of nodes of a four-node tetrahedron.

12. The computer implemented method according to claim 8, wherein determining, based on the converting of the input color value to the output color space representation, the set of nodes of the multi-dimensional lookup table that are to be analyzed to control operation of the printhead, further comprises:
determine, based on the converting of the input color value to the output color space representation, the set of nodes of an eight-node cube.

13. A non-transitory computer readable medium having stored thereon machine readable instructions, the machine readable instructions, when executed, cause a processor to:
determine, based on conversion of an input color value to an output color space representation, a set of nodes that are to be analyzed to control an operation of a thermal printhead;
determine, based on a position of the input color value from each node of the set of nodes, a corresponding probability associated with each node of the set of nodes; and
control, based on the determined probability associated with each node of the set of nodes, the operation of the thermal printhead.

14. The non-transitory computer readable medium according to claim 13, wherein the machine readable instructions to determine, based on the converting of the input color value to the output color space representation, the set of nodes that are to be analyzed to control the operation of the thermal printhead, when executed, further cause the processor to:
determine, based on the converting of the input color value to the output color space representation, the set of nodes of a four-node tetrahedron or an eight-node cube.

15. The non-transitory computer readable medium according to claim 13, wherein the machine readable instructions to control, based on the determined probability associated with each node of the set of nodes, the operation of the thermal printhead, when executed, further cause the processor to:
divide, based on the determined probability associated with each node of the set of nodes, a threshold range of a dither matrix into probability ranges for printing contents of nodes of a lookup table;
determine a pixel position corresponding to the input color value;
determine, based on analysis of the set of nodes, a node of the set of nodes that corresponds to the determined pixel position and a divided threshold range of the dither matrix; and control, based on an output pulse pattern associated with the determined node, the operation of the thermal printhead.

\* \* \* \* \*